United States Patent Office 3,300,508
Patented Jan. 24, 1967

3,300,508
2-[N'-(PANTOYL)-2'-AMINOETHYL]-2-THIAZOLINE
Masao Shimizu, Genkichi Ohta, and Osamu Nagase, Tokyo, Seizaburo Okada, Chiba, and Yasuhiro Hosokawa, Tokyo, Japan, assignors to Daiichi Seiyaku Co., Ltd., Tokyo, Japan, a corporation of Japan
No Drawing. Filed Aug. 26, 1963, Ser. No. 304,625
Claims priority, application Japan, Sept. 8, 1962, 37/38,760; Sept. 11, 1962, 37/39,117
1 Claim. (Cl. 260—306.7)

The present invention relates to 2-[N'-(pantoyl)-2'-aminoethyl]-2-thiazoline, a new intermediate for the synthesis of pantetheine and pantethine.

It is the principal object of the invention to provide a new intermediate which in turn provides an advantageous and economical process for the synthesis of pantetheine and pantethine.

Pantetheine and pantethine are the component materials of coenzyme A and are useful compounds as medical supplies and cosmetics.

In the past, various processes have already been described for the synthesis of pantetheine and the derivatives thereof, and these processes are mainly (1) the process which comprises condensing pantolactone with aletheine or the derivatives thereof (Japanese Patent No. 225,364; Snell et al., "Methods of Enzymology," vol. 3, p. 918, 1957), (2) the process which comprises condensing cysteamine or derivatives thereof with a functional derivative of pantothenic acid, e.g., ester, azide, or the mixed acid anhydride (Japanese Patent No. 217,106; Japanese Patent No. 241,757; U.S.P. 2,625,565; U.S.P. 2,857,408; B.P. 707,709), and (3) the process which comprises condensing N - (pantothenyl) - ethyleneimine with acyl mercaptan (B.P. 749,122).

However, the previously known methods for the production of pantetheine or pantethine are all accompanied by numerous disadvantages. Certain intermediates are high in cost because the starting materials and other agents are relatively expensive. In certain processes, it is necessary to carry out the reaction at a temperature of about 0° C. or lower and moreover, in a strictly anhydrous state. The process of the present invention gives a markedly higher yield than that of the hitherto known processes described above and avoids the disadvantages therein.

The intermediate of the present invention renders it possible to provide a process for the synthesis of pantetheine and pantethine which is quite different from any of the above described known processes and its reaction formulae can be represented as follows:

Thus, such process is characterized by using as an intermediate a new compound, 2-[N'-(pantoyl)-2'-aminoethyl]-2-thiazoline obtained by the condensation of pantothenonitrile with cysteamine, and by producing pantetheine and pantethine therefrom.

Pantothenonitrile used as a starting material in the process of the present invention is a known compound obtained by the condensation of pantolactone with 3-amino-propionitrile (cf.: Shive and Snell: Journal of Biological Chemistry, vol. 160, p. 287, 1945; U.S.P. 2,369,839; and U.S.P. 2,870,188). From the viewpoint of biological activities, the D-form of pantothenonitrile is advantageously used and it is preferable to use a crystalline form obtained by the method that will be illustrated in Example 1 below, while the D-form of pantothenonitrile has hitherto been known as an oily crude material.

2-[N'-(pantoyl)-2'-aminoethyl]-2-thiazoline may be obtained by heating a mixture of pantothenonitrile and cysteamine at 50° C. to 100° C. with or without the use of a lower aliphatic alcohol, such as, methyl alcohol, ethyl alcohol, propyl alcohol, or isopropyl alcohol as the solvent. The thus-obtained 2 - [N' - (pantoyl) - 2'-aminoethyl]-2-thiazoline is an oily material which can be distilled by molecular distillation.

Pantetheine may be obtained by the reaction of the above-obtained 2-[N'-(pantoyl)-2'-aminoethyl]-2-thiazoline with water under mild conditions in an inert atmosphere, for example, under the stream of nitrogen gas, which prevents oxidation by atmospheric oxygen. In this reaction, the presence of an acidic catalyst, for example, a mineral acid, such as, hydrochloric acid or sulfuric acid; an organic acid, such as, formic acid, acetic acid, propionic acid; or a weak acidic ion-exchange resin, promotes the reaction, but the presence of such catalyst is not always necessary. The above-mentioned "mild conditions" means conditions under which an amido-bond is not hydrolysed or is slightly hydrolysed. Under such conditions that amido-bond is hydrolysed to a greater extent, the liberation of the pantoyl group as well as other side reactions occurs with the result that the yield of pantetheine is lowered. It is preferable to carry out the reaction at a pH of 2.5 to 7.5 and at a temperature of about 10° C. to 100° C.

In order to produce pantethine, the reaction of said 2-[N'-(pantoyl)-2'-aminoethyl]-2-thiazoline with water is carried out in the presence of oxygen to give a mixture of pantethine and pantetheine. Other conditions for the reactions of 2-[N'-(pantoyl)-2'-aminoethyl]-2-thiazoline with water are similar to those in the above-mentioned case of the production of pantetheine. Then, the mixture is, with or without being separated from the reaction liquid, oxidised with an oxidising agent selected from the

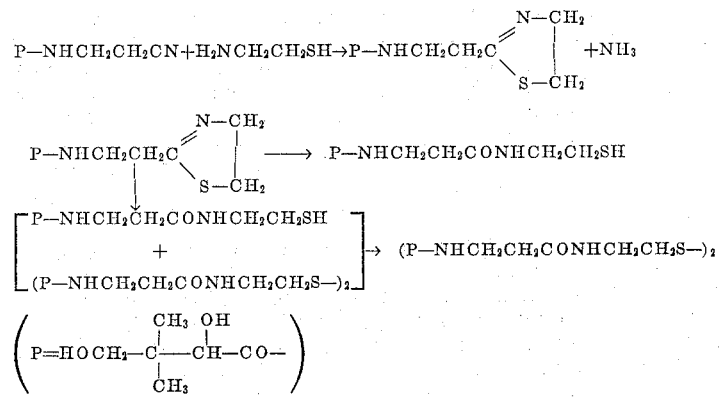

group consisting of air, iodine, and hydrogen peroxide. It is preferable to carry out the oxidation at a low temperature under an ammoniacal alkaline condition by using hydrogen peroxide as an oxidising agent. The ferrous or ferric ion may be used as a catalyst for the oxidation, but the use of such catalyst is not always necessary. From the viewpoint of biological activities, it is appropriate to use the D- form of 2-[N'-(pantoyl)-2'-aminoethyl]-2-thiazoline.

This invention is further disclosed in the following examples which are illustrative but not limitative thereof.

Example 1

5.0 g. of D-pantothenonitrile and 2.1 g. of cysteamine were dissolved in 20 ml. of ethyl alcohol and, after heating the solution under reflux for about 6 hours, the solvent was removed. The residue was dissolved in 100 ml. of acetone and impurities were removed by filtration, and then acetone was distilled off to give 6.5 g. of yellow and oily 2-[N'-(D-pantoyl)-2'-aminoethyl] - 2 - thiazoline. The yield was substantially theoretical. In order to obtain a colorless product, the crude material was purified by partition chromatography through a column of diatomaceous earth (Celite 535) with water-saturated methyl ethyl ketone. The purified product was subjected to a molecular distillation at a bath temperature of 100° C. under a reduced pressure of $10^{-4}$ mm. Hg. 2-[N'-(D-pantoyl)-2'-aminoethyl]-2-thiazoline thus obtained was a colorless viscous liquid having somewhat hygroscopic property. Maximum ultraviolet absorption (ethyl alcohol solution): 231 m$\mu$ ($\epsilon$, 2670), 246.5 m$\mu$ ($\epsilon$, 2320), $(\alpha)_D^{23}$ +23° (aqueous solution).

Analysis of $C_{11}H_{20}N_2O_3S$.—Calculated: C, 50.74; H, 7.74; N, 10.76. Found: C, 50.82; H, 7.75; N, 10.59.

D-pantothenonitrile used in the reaction as the starting material was synthesized as follows:

A mixture of 3.77 g. of D-pantolactone and 2.03 g. of $\beta$-aminopropionitrile was heated at to 55° C. for about 4 hours. After cooling, the product was crystallised by being inoculated with the resulting product. By recrystallizing it from ethyl acetate, 5.0 g. (86% of theory) of D-pantothenitrile having a melting point of 82° C. to 84° C. was obtained. $(\alpha)_D^{26}$ +31.5° (aqueous solution).

Example 2

The following procedures were conducted under a stream of nitrogen gas.

6.5 g. of 2-[N'-(D-pantoyl)-2'-aminoethyl]-2-thiazoline were disolved in 100 ml. of water and the solution was added with 30 ml. of a weak-acidic ion-exchange resin (Amberlite IRC 50), and the mixture was shaken at room temperature for 24 hours. The reaction mixture was filtered and the filtrate was passed through a layer of weak-alkaline ion-exchange resin (Amberlite IR 4B) to remove acidic impurities, concentrated under reduced pressure, and then dried in vacuum. 6.38 g. (91.8% of theory) of pantetheine were obtained as a viscous oil, and it showed in a paper chromatography R$f$ 0.66 when water-saturated n-butanol was used as the solvent, and showed R$f$ (rate of flow) 0.66 when water-saturated methyl ethyl ketone was used as the solvent. $(\alpha)_D^{27}$ +18° (aqueous solution).

Example 3

The following procedures were carried out under a stream of nitrogen gas.

6.5 g. of 2-[N'-(D-pantoyl)-2'-aminoethyl]-2-thiazoline were dissolved in 130 ml. of 0.1-N acetic acid and heated at 60° C. for about 5 hours. The solution was concentrated under reduced pressure. The residue was dissolved in 100 ml. of water and passed through a layer of weak alkaline ion-exchange resin (Amberlite IR 4B) and then through a layer of weak acidic ion-exchange resin (Amberlite IRC 50) to remove acidic and basic impurities. The treated solution was, after being concentrated under reduced pressure, dried in vacuum to give 6.8 g. (97.8% of theory) of pantetheine.

Example 4

6.5 g. of 2-[N'-(D-pantoyl)-2'-aminoethyl]-2-thiazoline were dissolved in 150 ml. of water and the solution was heated for 7 hours in air under reflux. After being cooled, the solution was passed through a layer of weak acidic ion-exchange resin and a layer of weak alkaline ion-exchange resin and then concentrated under reduced pressure to give 5.8 g. of a viscous liquid. As the result of the paper chromatography as well as the quantitative analysis of the sulfhydryl group, it was estimated that the product was a mixture of 76% pantetheine and 24% pantethine. The mixture was dissolved in 60 ml. of water and 2.7 ml. of 10% aqueous ammonia and 10 mg. of ferrous sulfate were added to the solution to give a reddish purple solution. A 3.77% hydrogen peroxide solution was added to the solution while ice-cooling until the solution was discolored. The solution was passed through a weak acidic ion-exchange resin and then a weak alkaline ion-exchange resin and concentrated under reduced pressure. The residue was dissolved in 5 ml. of ethyl alcohol and 50 ml. of ether were added into the solution to deposit a precipitate, the solvent was removed by decantation, and the precipitate obtained was dried in vacuum to give 5.54 g. (80% of theory) of colorless resin of pantethine. $(\alpha)_D^{23}$ +18° (aqueous solution). The product showed in a paper chromatography R$f$ 0.60 when water-saturated n-butanol was used as the solvent and showed R$f$ 0.35 when water-saturated methyl ethyl ketone was used as the solvent.

Analysis of $C_{22}H_{42}O_8N_4S_2$.—Calculated: C, 47.62; H, 7.64; N, 10.10. Found: C, 47.51; H, 8.02; N, 10.38.

Example 5

2.6 g. of 2-[N-(D-pantoyl)-2'-aminoethyl]-2-thiazoline were dissolved in 20 ml. of N acetic acid and heated at 60° C. for about 5 hours. After being concentrated under reduced pressure, the residue was dissolved in 20 ml. of water and 1.3 ml. of 10% aqueous ammonia and 10 mg. of ferrous sulfate were added into the solution. The solution was then oxidised under ice-cooling by using 3.7% hydrogen peroxide solution and treated in the same manner as in Example 4 to give 2.51 g. (90.6% of theory) of pantethine.

Example 6

A solution containing 13.0 g. of 2-[N'-(D-pantoyl)-2'-aminoethyl]-2-thiazoline and 50 ml. of water was prepared, adjusted to a pH of 5.3 with N hydrochloric acid and heated at 60° C. for 3 hours. After the solution was adjusted to a pH of 8.3 with a 5% ammonia solution, a 3.5% hydrogen peroxide solution was added under ice-cooling until the solution was no longer colored by a sodium nitroprusside reagent. The solution was then passed through a column of 110 ml. of a 1:1 mixture of acidic and alkaline ion-exchange resins (Amberlite IRA 410 and IR 120) and the column was eluted with 1 l. of water. The eluate was concentrated in vacuum and then dried at a temperature of 55° C. and under a pressure of 5 mm. Hg. 9.1 g. (65.6% of theory) of pantethine were obtained.

Example 7

A mixture of 10 g. of cysteamine and 2.4 g. of pantothenonitrile was heated at about 90° C. for 6 hours under a stream of nitrogen gas. After cooling the mixture thus treated, 45 ml. of 0.2 N acetic acid were added thereto. This mixture was heated at about 60° C. for 5 hours and then concentrated in vacuum. 10 ml. of water, 1.5 ml. of a 2.8% ammonia solution and 5 mg. of ferrous sulfate were added to the residue to give a reddish purple solution. A 3.5% hydrogen peroxide solution was added to this solution under ice-cooling until the solution was decolored. 2.4 g. of pantethine were obtained from the reaction mixture by a treatment analogous to that shown in Example 6.

What is claimed is:

2-[N'-(pantoyl)-2'-aminoethyl]-2-thiazoline.

References Cited by the Examiner

UNITED STATES PATENTS 2,680,767   6/1954   Snell et al. _____ 260—251

OTHER REFERENCES

Banashek et al.: Chemical Abstracts, vol. 55 (1961), p. 24740.

Linderstrom-Lang et al.: J. Biological Chemical, vol. 137 (1941), pp. 443–55.

Reid: Organic Chemical of Bivalent Sulfur, vol. I, Chemical Pub. (1958), p. 118.

ALEX MAZEL, *Primary Examiner.*

HENRY R. JILES, R. J. GALLAGHER,

*Assistant Examiners.*